United States Patent
Lee (10) Patent No.: US 7,571,455 B2
(45) Date of Patent: Aug. 4, 2009

(54) TV HAVING LANGUAGE SELECTION FUNCTION AND CONTROL METHOD OF THE SAME

(75) Inventor: Jae Kyung Lee, Daeku (KR)

(73) Assignee: LG Electronics Inc., Seoul (KR)

( * ) Notice: Subject to any disclaimer, the term of this patent is extended or adjusted under 35 U.S.C. 154(b) by 1622 days.

(21) Appl. No.: 09/841,007

(22) Filed: Apr. 25, 2001

(65) Prior Publication Data

US 2001/0037510 A1    Nov. 1, 2001

(30) Foreign Application Priority Data

Apr. 27, 2000   (KR) ................. 2000-22480

(51) Int. Cl.
*H04N 7/173* (2006.01)
(52) U.S. Cl. ...................... 725/109; 348/486
(58) Field of Classification Search ............... 725/110, 725/131, 139; 704/2, 3
See application file for complete search history.

(56) References Cited

U.S. PATENT DOCUMENTS

| | | | | |
|---|---|---|---|---|
| 5,543,851 A | * | 8/1996 | Chang | 348/468 |
| 5,694,163 A | * | 12/1997 | Harrison | 725/110 |
| 5,918,013 A | * | 6/1999 | Mighdoll et al. | 709/217 |
| 5,929,849 A | * | 7/1999 | Kikinis | 725/113 |
| 6,002,394 A | * | 12/1999 | Schein et al. | 725/39 |
| 6,161,082 A | * | 12/2000 | Goldberg et al. | 704/3 |
| 6,324,694 B1 | * | 11/2001 | Watts et al. | 725/32 |
| 6,473,778 B1 | * | 10/2002 | Gibbon | 715/501.1 |
| 6,510,557 B1 | * | 1/2003 | Thrift | 725/110 |
| 6,857,022 B1 | * | 2/2005 | Scanlan | 709/229 |
| 6,901,367 B1 | * | 5/2005 | Berstis et al. | 704/277 |
| 6,985,850 B1 | * | 1/2006 | Scanlan | 704/2 |
| 2001/0044726 A1 | * | 11/2001 | Li et al. | 704/277 |

FOREIGN PATENT DOCUMENTS

WO    WO 9718516 A1 *   5/1997

\* cited by examiner

*Primary Examiner*—Scott Beliveau
*Assistant Examiner*—Bennett Ingvoldstad
(74) *Attorney, Agent, or Firm*—KED & Associates, LLP (57) ABSTRACT

A television (TV) with a language selection function and an associated control method is provided which allows a user to select a desired display language regardless of a language in which programming is broadcast. The TV includes a network interface which allows a control unit of the TV to transmit pertinent character information extracted from the broadcast signal to an appropriate translation site through a network interface unit and a translation relay site server. The character information is then translated at the translation site, synched with the corresponding audio information, and relayed back to the control unit for output through the TV. In this manner, character information included in a broadcast signal may be quickly and accurately translated into a language selected by a user and output on a display portion of the TV.

22 Claims, 5 Drawing Sheets

TV HAVING LANGUAGE SELECTION FUNCTION AND CONTROL METHOD OF THE SAME

BACKGROUND OF THE INVENTION

1. Field of the Invention

The present invention relates to a TV (television), in particular to a TV (Television) having a language selection function and a control method of the same which is capable of displaying character information included in a broadcast signal on a screen.

2. Description of the Prior Art

Recently, various types of televisions from a small model such as a 14 inch television to a projection television not less than 60 inch are introduced to a consumer.

In the meantime, the analog TV has lots of problems while developing to a scale-up and a high-function. In other words, there is the problem such as a picture quality lowering, a broadcast channels limitation, an one-way mediums limitation, and market saturation of an analog TV etc. Accordingly, a digital television is introduced in order to make up for the weak points in the analog television.

Presently, developing of the technology about the digital TV is progressing actively, the technology has entered a new phase performing a test broadcast or a regular broadcast about the digital TV.

The digital TV comprises an additional information providing function as well as a basic video and audio information providing function, among them there is a character information and audio information providing functions such as a caption, a EPG (Electronic Program Guide) etc.

Hereinafter, a construction of the digital TV in accordance with the prior art will now be described with reference to accompanying FIG. 1.

Figure 1:
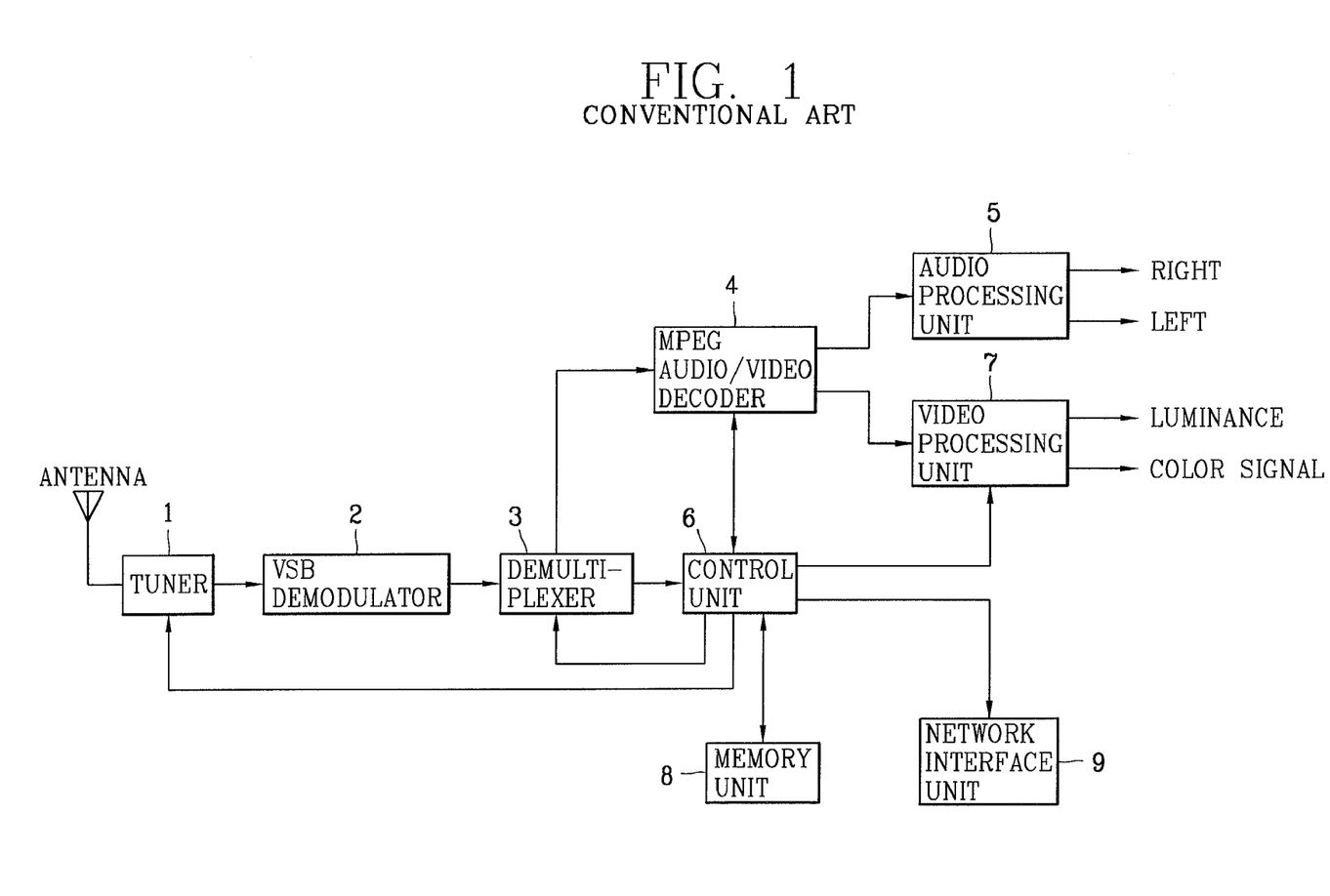
FIG. 1 is a block diagram illustrating a construction of a digital TV in accordance with the prior art.

FIG. 1 is a block diagram illustrating the construction of the digital TV in accordance with the prior art.

As depicted in FIG. 1, the digital TV comprises a tuner 1 for tuning in to a broadcast signal of a user selection channel among broadcast signals of each channel received through an antenna, a VSB (Vestigial Side Band) demodulator 2 for correcting an error by demodulating the user selection broadcast signal and outputting the signal after converting it into a transport stream format, a demultiplexer 3 for demultiplexing the transport stream (dividing into video, audio and additional information signal sequence), a MPEG (Moving Picture Expert Group) audio/video decoder 4 for outputting video and audio signals by extending/restoring the demultiplexed transport stream (video and audio signal sequences), an audio processing unit 5 for converting the audio signal into an analog audio signal in order to output the audio signal through a speaker, a video processing unit 7 for converting the video signal into luminance and color signals in order to display the video signal on a screen, a memory unit 8 for storing the additional information outputted from the demultiplexer 3, a control unit 6 for controlling each part of the system and performing an database operation about the stored additional information in order to display the information by a graphic user interface, and a network interface unit 9 for performing a two-way communication such as the internet. An output operation of character information of the digital TV will now be described.

First, the control unit 6 judges whether a character information mode for providing character information such as a caption or an EPG (Electronic Program Guide) to a user is 'ON'. In addition, when the user operates the character information mode as an 'ON' state, the control unit 6 transmits user selection character information to the MPEG audio/video decoder 4 by setting a pertinent packet ID in the demultiplexer 3.

After that, the control unit 6 controls the MPEG audio/video decoder 4 to extract and transmit only the user selection character information in the character information. Herein, the control unit 6 decodes the character information transmitted from the MPEG audio/video decoder 4, constructs an OSD corresponding to the transmitted character information, and stores it temporarily in the memory unit 8.

And, the control unit 6 transmits the OSD to the video processing unit 7 in order to display it by mixing with a broadcast video. At the same time, it performs signal processing of audio information synchronized with the OSD and outputs it to a speaker. Herein, the character information is outputted only as the English language or a certain region language. In other words, because character information of the TV in accordance with the prior art is outputted as only one language, it is impossible to perform a language selection in accordance with a user taste, accordingly it is impossible to satisfy a desire of a user.

As described above, in the digital TV in accordance with the prior art, because character information is outputted as only the English language or a certain region language, it is impossible to select a language in accordance with a user taste, accordingly it can not satisfy a desire of a user.

SUMMARY OF THE INVENTION

The object of the present invention is to provide a TV having a language selection function and a control method of the same which is capable of outputting character information of a TV and audio information corresponding to the character information with a user selection language.

In order to achieve the object of the present invention, the TV having the language selection function in accordance with the present invention comprises a control unit for receiving character information translated into a user request language, a video processing unit for displaying the received character information on a screen, and an audio processing unit for outputting audio information synchronized with the translated character information.

In addition, in order to achieve the object of the present invention, the TV having the language selection function comprises a network interface unit for contacting to a translation site, a storing unit for storing contact information of translation sites corresponding to various languages and an operation program related to translation, a control unit for contacting to the translation site corresponding to a user selection language by using the contact information of the translation site corresponding to the various languages, transmitting character information to be translated in accordance with the operation program related to translation, and receiving the translated character information from the translation site, and a video processing unit for displaying the received character information on a screen.

In addition, in order to achieve the object of the present invention, the control method of the TV having the language selection function comprises judging whether a language of character information included in a broadcast signal corresponds to a user selection language, transmitting the character information included in the broadcast signal to a translation relay site server in order to translate it into the user selection language when the language of the character information included in the broadcast signal is different from the user selection language, receiving translated character information from the translation site after transmitting the transmitted character information to the translation site in order to translate it into the user selection language, and displaying the received character information on a screen.

In addition, in order to achieve the object of the present invention, the control method of the TV having the language selection function comprises judging whether a language of character information included in a broadcast signal corresponds to a user selection language, requesting a translation by contacting to an internet translation site corresponding to the user selection language among preset internet translation sites and transmitting the character information when the language of the character information included in the broadcast signal is different from the user selection language, and displaying the translated character information on a screen and outputting the audio information by receiving the translated character information and audio information synchronized with it from the internet translation site.

DETAILED DESCRIPTION OF THE PREFERRED EMBODIMENT

Hereinafter, an embodiment of a TV (Television) having an OSD (On Screen Display) function and a control method of the same in accordance with the present invention will now be described in detail with reference to accompanying FIGS. 2~4.

Figure 2:
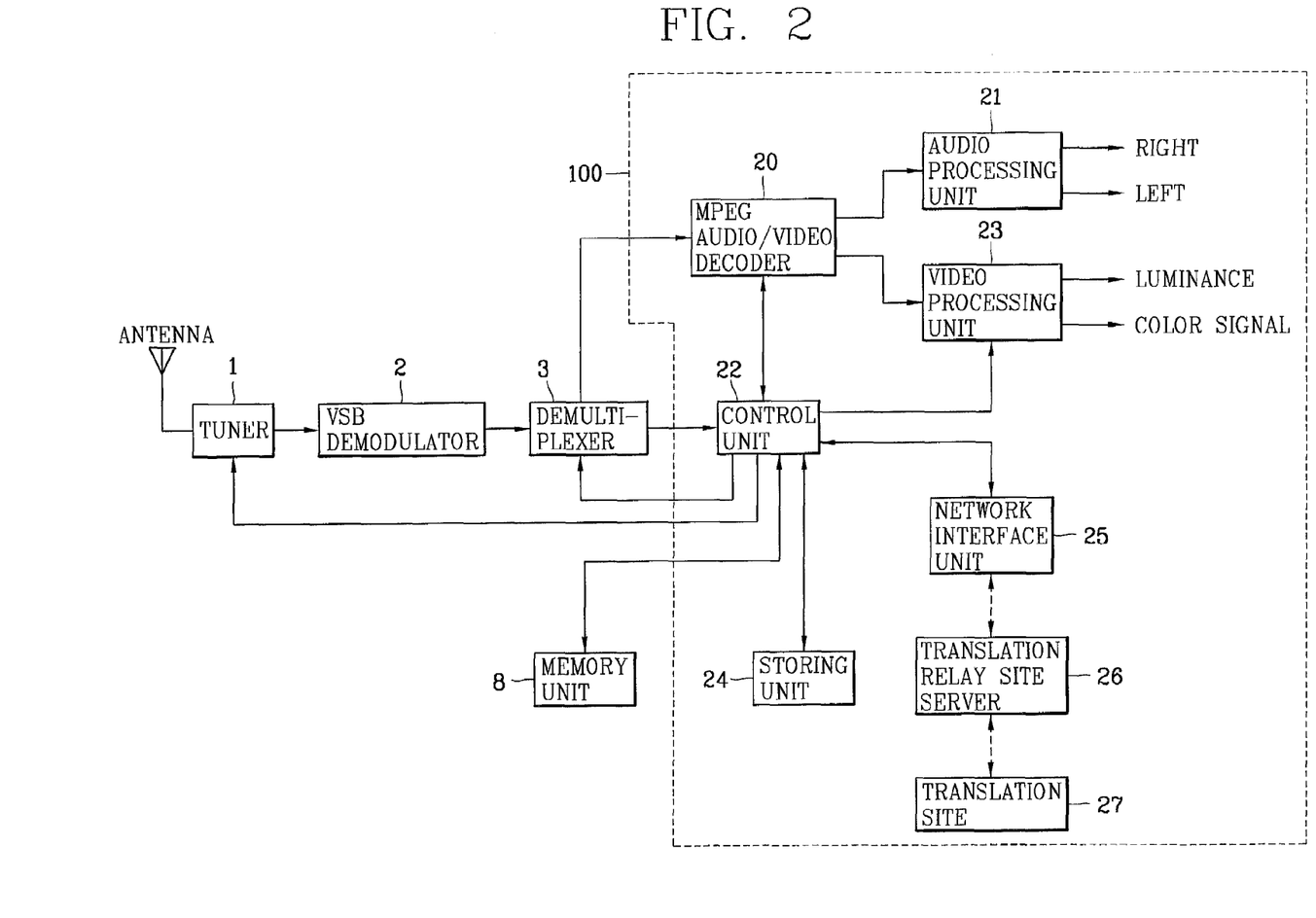
FIG. 2 is a block diagram illustrating a construction of a digital TV having a language selection function in accordance with the present invention.

FIG. 2 is a block diagram illustrating a construction of a digital TV (Television) having a language selection function in accordance with the present invention.

As described in FIG. 2, the digital TV having the OSD (On Screen Display) function in accordance with the present invention comprises a tuner 1 for tuning in to a broadcast signal of a channel selected by a user among broadcast signals of each channel received through an antenna, a VSB (Vestigial Side Band) demodulator 2 for correcting an error by demodulating the user selection broadcast signal and outputting the signal after converting it into a transport stream format, a demultiplexer 3 for demultiplexing the transport stream (dividing into video, audio and additional information signal sequences), a MPEG (Moving Picture Expert Group) audio/video decoder 20 for outputting video and audio signals by extending/restoring the demultiplexed transport stream (video and audio signal sequences), an audio processing unit 21 for converting the audio signal into an analog audio signal in order to output the audio signal through a speaker, a video processing unit 23 for converting the video signal into luminance and color signals in order to display the video signal on a screen, a memory unit 8 for storing the additional information outputted from the demultiplexer 3, a storing unit 24 for storing contact information of a translation relay site and an operation program related to a translation, a control unit 22 for controlling each unit of the system, storing the stored additional information as an information format to be displayed by a graphic user interface, and transmitting character information and language information to be translated into a user request language, a network interface unit 25 for performing two-way communication such as an internet, a translation site 27 for translating and transmitting the character information, and a translation relay site server 26 for providing the character information transmitted from the translation site 27 to the control unit 22 through the network interface unit 25.

Hereinafter, parts performing the same operation with parts in FIG. 1 will be described with the same reference numerals, and overlapped explanation will be abridged.

Accordingly, the character information processing unit 100, translation relay site server 26, translation site 27 comprised in the digital TV having the language selection function in accordance with the present invention will now be described in detail with reference to accompanying FIGS. 3 and 4.

Figure 3A:
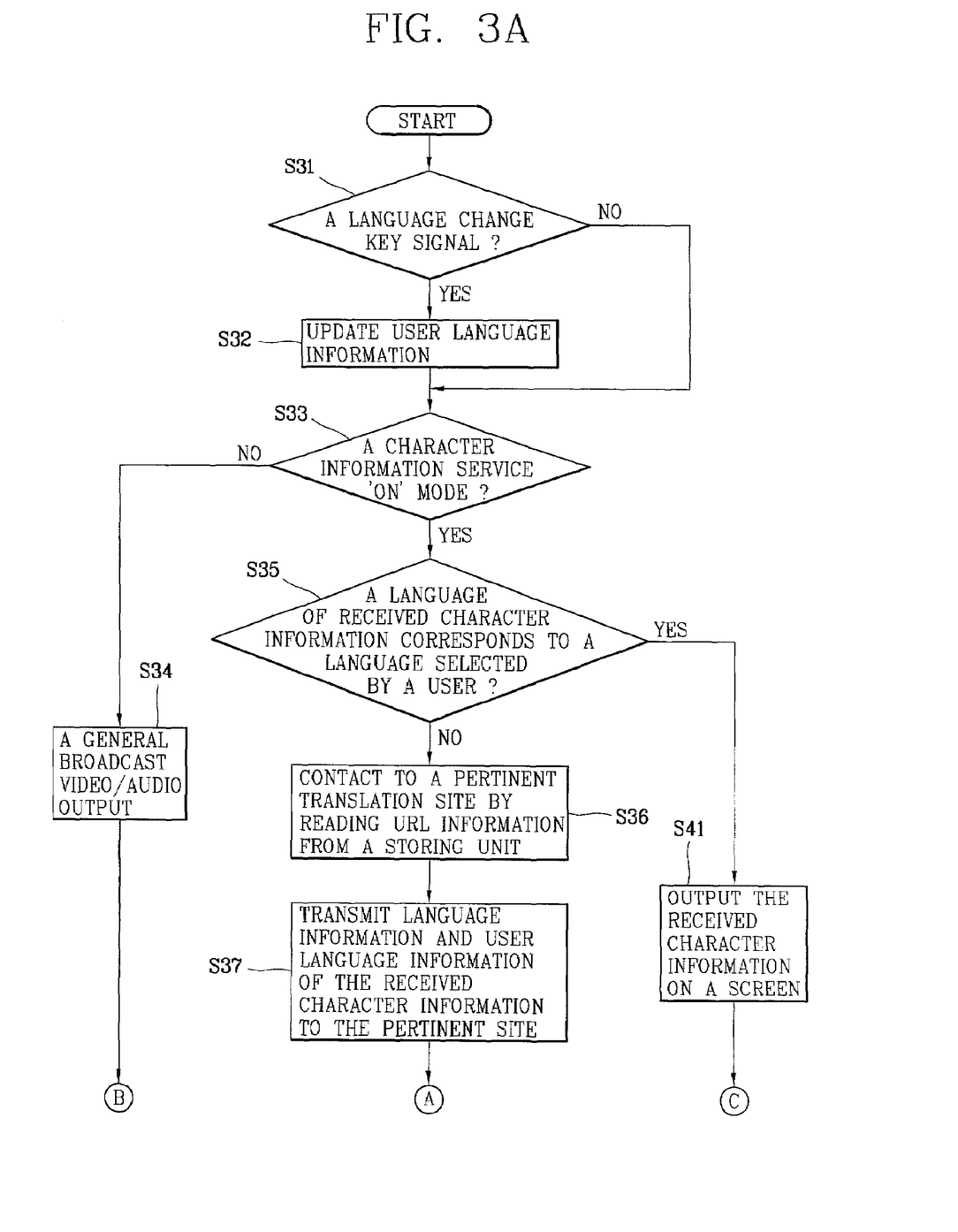
FIGS. 3A and 3B are flow charts illustrating a control method of a digital TV having the language selection function of FIG. 2.
Figure 3B:
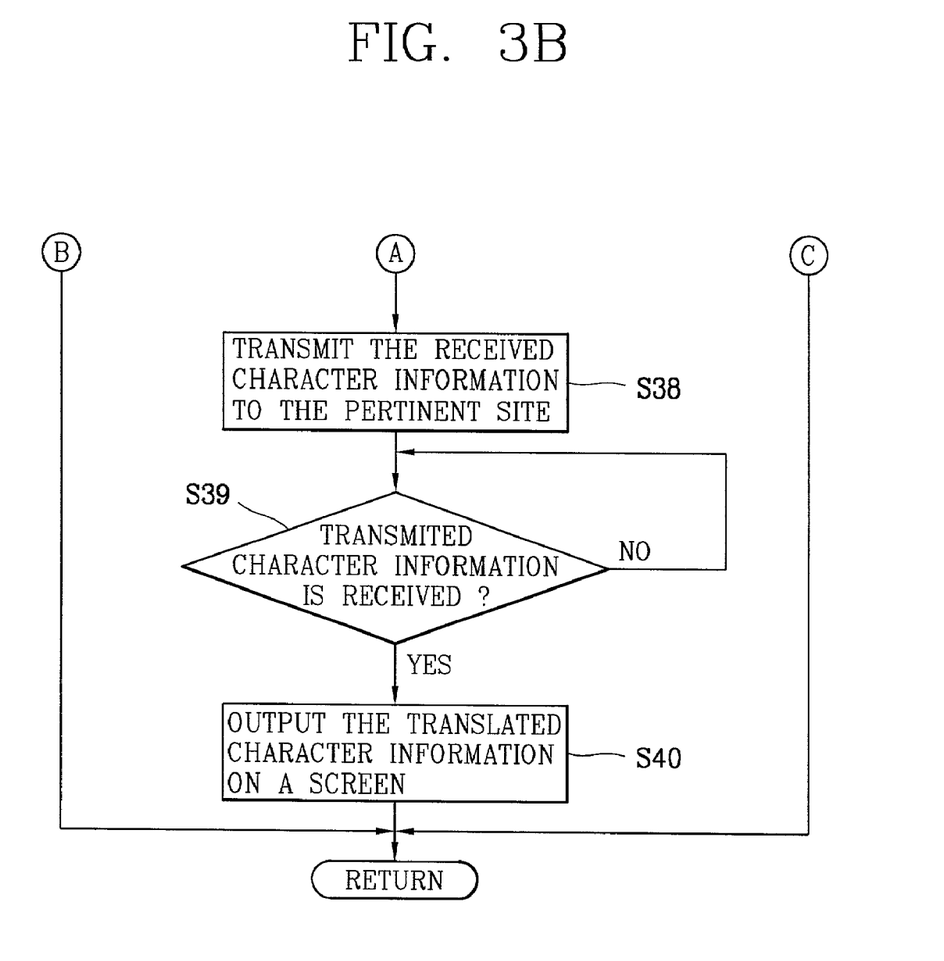

FIGS. 3A and 3B are flow charts illustrating the control method of the digital TV having the language selection function of FIG. 2 according to the present invention, it illustrates selecting a user request language, translating character information into the language selected by the user, and outputting the character information with the language selected by the user.

Herein, the character information processing unit 100 comprises the MPEG audio/video decoder 20, audio processing unit 21, video processing unit 23, control unit 22, network interface unit 25, and storing unit 24.

First, the control unit 22 judges whether a language change key signal is inputted S31. In other words, it is judged whether the language change key signal for selecting a user request language is inputted.

When the language change key signal is inputted, the control unit 22 updates the former set user language information into the user selection (request) language S32.

After that, the control unit 22 judges whether a character information service mode is 'ON' S33.

When the character information service mode is not 'ON', the control unit 22 outputs video and audio signals of a general broadcast program to a display and a speaker S34 by controlling the tuner 1, VSB demodulator 2, demultiplexer 3, MPEG audio/video decoder 20, video processing unit 23 and audio processing unit 21.

In the meantime, when the character information service mode is 'ON', the control unit 22 judges whether a language of character information included in additional information of the transport stream corresponds to the user selection language S35.

When the language of the character information included in the additional information corresponds to the user selection language, the control unit 22 outputs the character information included in the additional information to the video processing unit 23 in order to display it on the screen S41.

In the meantime, when the language of the character information included in the additional information does not correspond to the user selection language, the control unit 22 contacts to the translation relay site server 26 through the network interface unit 25 by reading contact information of the translation relay site from the storing unit 24 S36. Herein, the contact information can be URL information of the translation relay site which manages overall relay operation such as an internet site contact etc. for translating the character information into the user selection language. In addition, the contact information can be URL information of internet translation sites by each language for performing translation of the character information.

After that, the control unit 22 transmits character language information for defining kinds of language of the character information and user language information for defining kinds of user selection language to the translation relay site through the network interface unit 25 S37. In addition, the control unit 22 transmits character information (included in the additional information) to be translated to the translation relay site through the network interface unit 25 S38. Herein, the character information to be translated can comprise audio information synchronized with itself.

When the character language information, user language information, character information to be translated is inputted, the translation relay site server 26 translates the character information to be translated into a user selection language, and transmits the translated character information to the control unit 22 of the TV through the network interface unit 25.

And, the control unit 22 judges whether the translated character information is received from the translation relay site server 26 S39. In addition, when the translated character information is received from the translation relay site server 26, the control unit 22 controls in order to transmit the received character information to the MPEG audio/video decoder 20.

The MPEG audio/video decoder 20 decodes the transmitted character information and audio information synchronized with it, and embodies an OSD about the transmitted character information.

After that, the control unit 22 transmits the embodied OSD to the video processing unit 23. Herein, the video processing unit 23 mixes the transmitted OSD with a broadcast video, and displays it S40. At the same time, the control unit 22 transmits the audio information synchronized with the OSD to the audio processing unit 21. Herein, the audio processing unit 21 performs signal-processing of the transmitted audio information, and outputs the audio information through the speaker.

Hereinafter, translating the translated character information into the user selection language in the translation relay site server 26 and transmitting the translated character information to the control unit 22 of the TV through the network interface unit 25 will now be described in detail with reference to accompanying FIG. 4.

Figure 4:
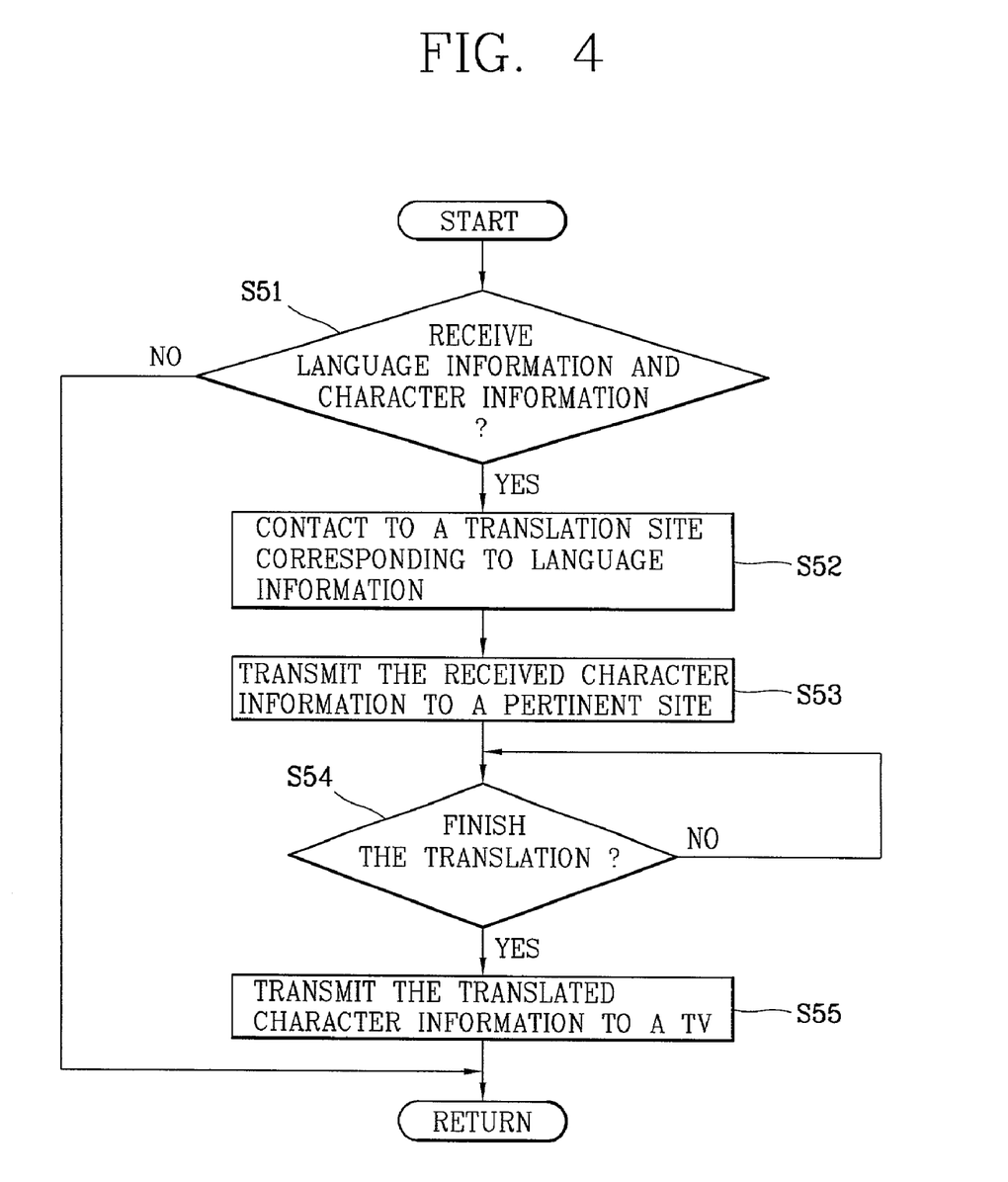
FIG. 4 is a flow chart illustrating an operation of a language translation operation in the control method of the digital TV having the language selection function of FIGS. 3A and 3B.

FIG. 4 is a flow chart illustrating an operation translating character information in the control method of the digital TV having the language selection function of FIGS. 3A and 3B. It will now be described in detail.

First, the translation relay site server 26 which is serviced by a TV manufacturer judges whether the language information and character information to be translated is received from outside (for example, TV) S51. Herein, the language information means character language information for defining kinds of language of character information included in the additional information and user language information for defining kinds of the user selection language.

When the language information and character information to be translated is received through the network interface unit 25 of the TV, the translation relay site server 26 contacts to the translation site 27 corresponding to the received language information S52. For example, when the character language information is the English language and the user selection language information is the Hindustani, the translation relay site server 26 contacts to the translation site 27 translating the English language into the Hindustani S52.

After that, the translation relay site server 26 transmits the character information to be translated transmitted from the TV (control unit 22 of the TV) to the translation site 27, and requests translation S53. Herein, the character information to be translated transmitted from the TV means character information to be translated into the user request language.

The translation relay site server 26 judges whether the character information to be translated is translated in the translation site 27 S54. In addition, When the character information to be translated is translated, the translation relay site server 26 transmits the translated character information to the control unit 22 of the TV through the network interface unit 25 S55.

In the meantime, in use of the translation relay site server 26 serviced from the TV manufacturer in the present invention, contact information of the translation site 27 can be updated at any time in order to make the translation relay site server 26 translate instantly and accurately the character information included in the additional information into the user request language.

In the meantime, when the character information to be translated is translated directly through the translation site 27 without using the translation relay site server 26, the control unit 22 judges the language of the character information included in the additional information and the user selection (request) language.

After that, when the language of the character information included in the additional information is different from the user selection (request) language, the control unit 22 transmits the character information (to be translated) included in the additional information by contacting directly to the translation site 27 translating the language of the character information included in the additional information into the user request language by using the operation program related to translation stored in the storing unit 24 and the contact information of the translation site, and requests translation.

And, the control unit 22 downloads the transmitted character information from the translation site 27, and outputs the downloaded character information on the screen after decoding and video-processing. At the same time, the control unit 22 transmits the audio information synchronized with the downloaded character information to the audio processing unit 21. Herein, the audio processing unit 21 outputs the transmitted audio information to the speaker after signal-processing.

As described above, the present invention is capable of translating character information such as a caption etc. provided as an additional function of a TV into a user request language instantly and accurately through a translation relay site or a translation site serviced from a TV manufacture side, accordingly the present invention can satisfy a desire of a user, and improve a convenience of a user.

What is claimed is:

1. A television (TV) having a language selection function, comprising:
    a control unit configured to receive closed caption character information in a first language, to send the closed caption character information to a translation site through a network interface based on contact information associated with a plurality of translation sites stored in a storing unit if it is determined that the first language does not correspond to a selected language, and to receive the translated closed caption character information corresponding to the selected language; and
    a video processing unit configured to receive the translated closed caption character information and to display the translated closed caption character information on a screen substantially in synch with corresponding audio information.

2. The TV having the language selection function according to claim 1, further comprising an audio processing unit configured to process the audio information synchronized with the translated closed caption character information displayed on the screen.

3. The TV having the language selection function according to claim 1, wherein the contact information comprises a URL (Uniform Resource Locator).

4. The TV having the language selection function according to claim 3, wherein the control unit is configured to contact a translation relay site server by using a URL associated with the translation site, and to receive the closed caption translated character information from the translation relay site server.

5. The TV having the language selection function according to claim 4, wherein the control unit is configured to contact the translation relay site server through a network interface unit.

6. The TV having the language selection function according to claim 5, wherein the translation relay site server is configured to receive closed caption character information and language information transmitted from the control unit, to translate the transmitted closed caption character information into a language corresponding to the language information, and to transmit the translated closed caption information to the control unit.

7. The TV having the language selection function according to claim 6, wherein the language corresponding to the language information is a language selected by a user.

8. The TV having the language selection function according to claim 5, wherein the translation relay site server is configured to receive translated closed caption character information from the translation site in accordance with the selected language, and to transmit the translated closed caption character information to the control unit.

9. The TV having the language selection function according to claim 8, wherein the translation site is configured to receive the closed caption character information to be translated from the translation relay site server, to translate the closed caption character information into the selected language, and to provide the translated closed caption character information to the translation relay site server.

10. The TV having the language selection function according to claim 1, wherein the control unit is configured to generate an OSD (On Screen Display) based on the translated closed caption character information, and to provide the translated closed caption character information to the video processing unit in order to display the OSD on the screen.

11. A TV having a language selection function, comprising:
a network interface unit configured to contact a translation site;
a storing unit configured to store contact information for at least one translation site which corresponds to a plurality of languages and an operation program related to translation;
a control unit configured to contact a translation site corresponding to a selected language based on the contact information stored in the storing unit, to transmit closed caption character information to be translated in accordance with the operation program stored in the storing unit, and to receive translated closed caption character information from the translation site; and
a video processing unit configured to display the translated closed caption character information on a screen substantially in synch with corresponding audio information.

12. The TV having the language selection function according to claim 11, further comprising an audio processing unit configured to output the corresponding audio information synchronized with the translated closed caption character information.

13. The TV having the language selection function according to claim 11, wherein the control unit is configured to generate an OSD (On Screen Display) including the received closed caption character information, and to provide the OSD to the video processing unit in order to display the on OSD the screen.

14. The TV having the language selection function according to claim 11, wherein the control unit is configured to contact a translation relay site server and to receive translated closed caption character information from the translation relay site server.

15. The TV having the language selection function according to claim 14, wherein the translation relay site server is configured to receive closed caption character information to be translated and language information from the control unit, to translate the closed caption character information into a language corresponding to the language information, and to transmit the translated closed caption character information to the control unit.

16. The TV having the language selection function according to claim 15, wherein the translation relay site server is configured to receive translated closed caption character information from the translation site, and to transmit the translated closed caption character information to the control unit.

17. A control method for a TV having a language selection function, comprising:
receiving closed caption character information in a first language and contacting an appropriate translation site through a network interface if it is determined that the first language associated with the closed caption character information does not correspond to a selected language, comprising:
selecting the appropriate translation site based on the selected language and contacting the appropriate translation site based on previously stored contact information related to a plurality of translation sites;
requesting translation of the closed caption character information from the first language to the selected language by transmitting the closed caption character information to the appropriate translation site; and
receiving closed caption character information which has been translated into the selected language from the translation site; and
displaying the translated closed caption character information on a screen substantially in synch with corresponding audio information.

18. The control method of the TV having the language selection function according to claim 17, wherein receiving closed caption character information in a first language and contacting an appropriate translation site through a network interface if it is determined that the first language associated with the closed caption character information does not correspond to a selected language further comprises:
scanning a signal which includes language information associated with the closed caption character information to determine if the first language corresponds to the selected language;
transmitting the closed caption character information included in the signal to a translation relay site server if the first language included in the signal is different from the selected language; and
transmitting the closed caption character information from the translation relay site server to the appropriate translation site, translating the closed caption character information into the selected language and, transmitting the translated closed caption character information from the translation site to the translation relay site server.

19. A control method for a TV having a language selection function, comprising:
  determining if a language of closed caption character information included in a signal corresponds to a selected language;
  requesting translation of the closed caption character information by contacting an internet translation site corresponding to the selected language by selecting an appropriate translation site from a plurality of translation sites and transmitting the closed caption character information to the selected translation site if the language of the closed caption character information included in the signal is different from the selected language; and
  receiving translated closed caption character information from the translation site and displaying the translated closed caption character information on a screen substantially in synch with corresponding audio information.

20. The control method of a TV having a language selection function according to claim 19, wherein the signal comprises a broadcast signal.

21. The TV having a language selection function according to claim 1, wherein the translation site is selected from a plurality of previously stored translation sites.

22. The control method of a TV having a language selection function according to claim 17, wherein the translation site is selected from a plurality of previously stored translation sites.

* * * * *